C. J. LEDWIDGE.
VEHICLE SIGNAL.
APPLICATION FILED FEB. 6, 1919.
1,314,407.
Patented Aug. 26, 1919.
2 SHEETS—SHEET 2.
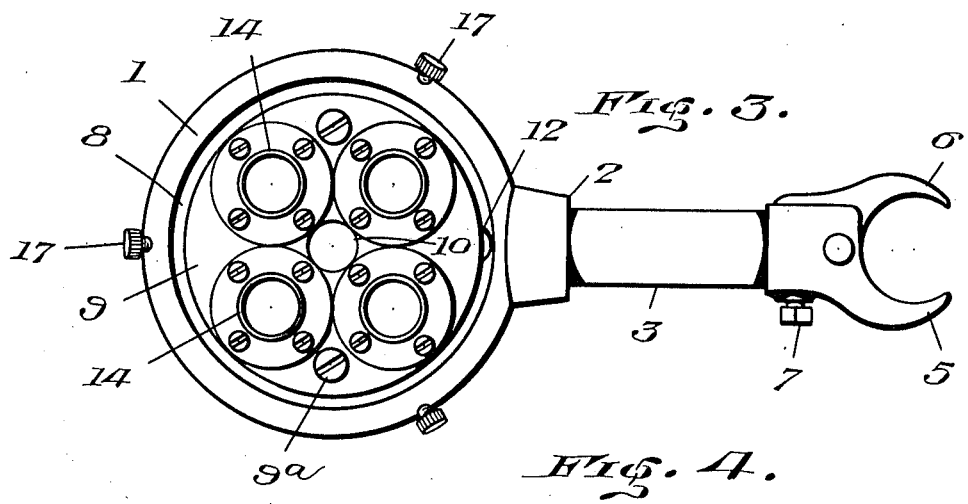
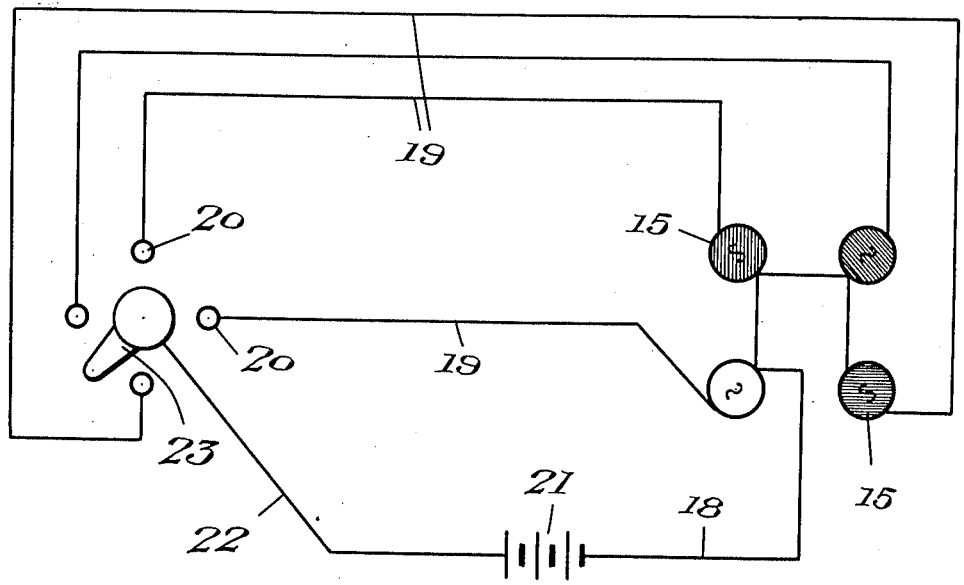
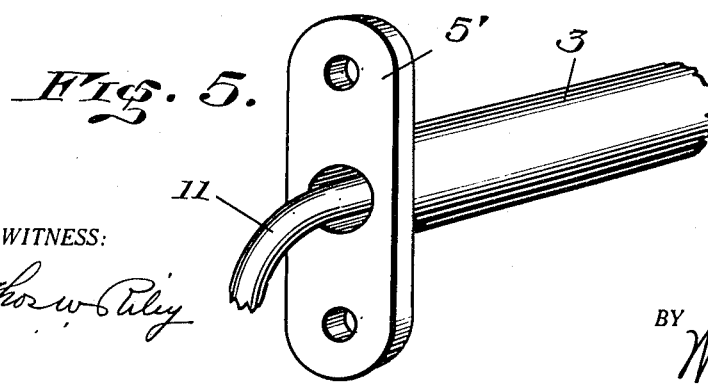
WITNESS:
Thos. W. Riley
INVENTOR.
C. J. Ledwidge
BY W. J. Fitz Gerald Co.
ATTORNEYS.

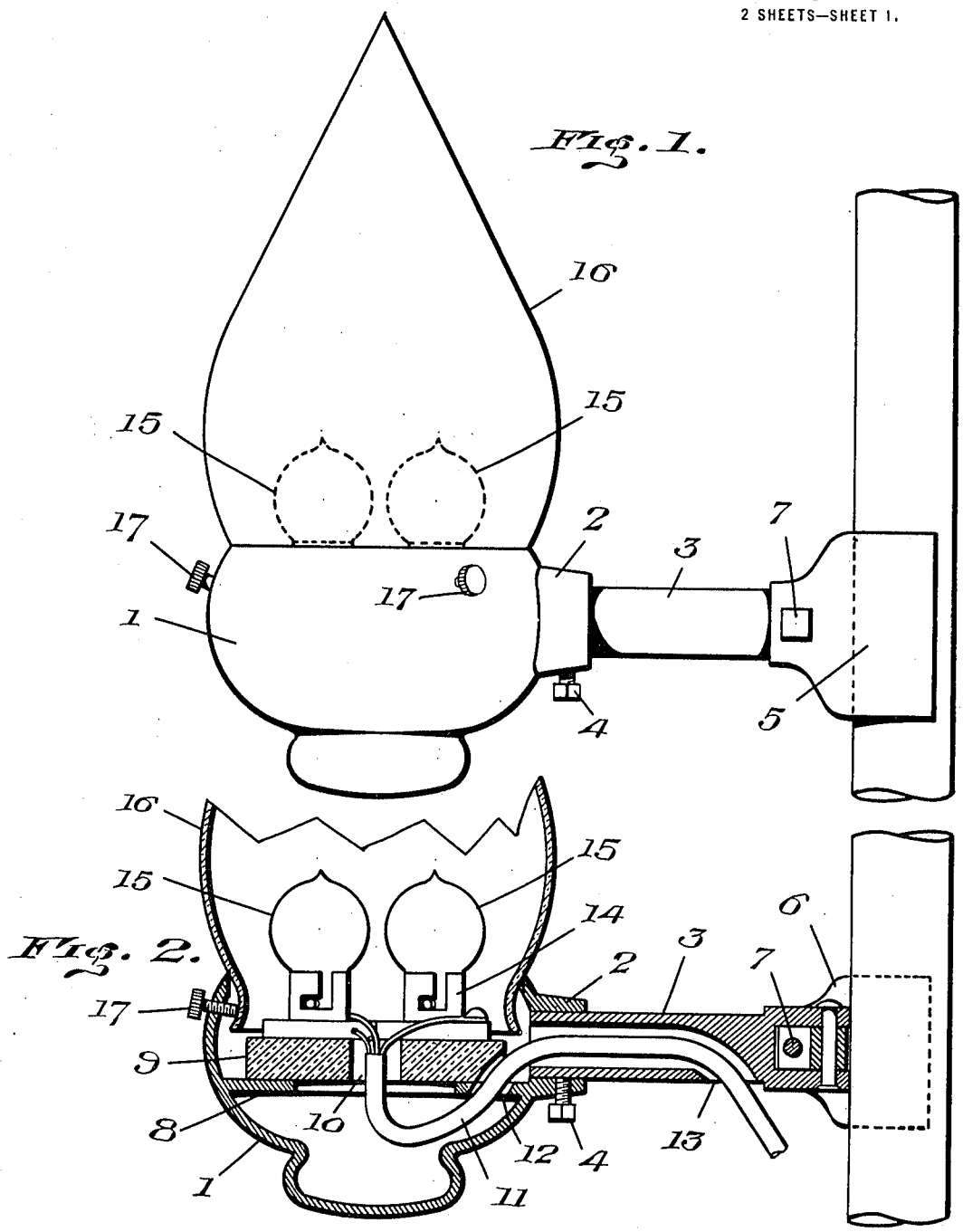

UNITED STATES PATENT OFFICE.

CHRISTOPHER JAMES LEDWIDGE, OF HOT SPRINGS, ARKANSAS.

VEHICLE-SIGNAL.

1,314,407.   Specification of Letters Patent.   Patented Aug. 26, 1919.

Application filed February 6, 1919. Serial No. 275,481.

*To all whom it may concern:*

Be it known that I, CHRISTOPHER J. LEDWIDGE, a citizen of the United States, residing at Hot Springs, in the county of Garland and State of Arkansas, have invented certain new and useful Improvements in Vehicle-Signals; and I do hereby declare the following to be a full, clear, and exact description of the invention, such as will enable others skilled in the art to which it appertains to make and use the same.

The present invention relates to electrical signals, and aims to provide a novel and improved electrical appliance for use on motor vehicles, and especially useful as a side bracket lamp, and for signaling the intentions of the operator to turn, stop or back up, thereby facilitating traffic and avoiding accidents and collisions.

One of the objects of the invention is the provision of a bracket lamp of novel and improved construction, and provided with a lamp cluster for use in signaling.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing wherein:—

Figure 1 is a side elevation of the improved bracket lamp.

Fig. 2 is a median vertical section thereof, a portion of the shade broken away.

Fig. 3 is a plan view with the shade and electric bulbs removed.

Fig. 4 is a diagrammatical view showing the electrical circuits.

Fig. 5 is a fragmentary perspective view showing a modified form of bracket.

In carrying out the invention, there is provided a bowl or cup 1 comprising the casing of the lamp, and provided at one side with an outstanding boss 2 sitting on the outer end of the tubular bracket arm 3, the boss 2 having a screw 4 or equivalent means to secure it on said arm. The inner end of the arm is provided with a clamp for attaching it to the post of a wind shield or other suitable supporting member. Thus, the inner end of the arm 3 has a fixed jaw 5 and a pivoted jaw 6, with a screw 7 or equivalent means for swinging the jaw 6 toward the jaw 5 to clamp the supporting member, thus constituting convenient means for quickly applying the bracket to a wind shield or other supporting member on the vehicle.

The bowl 1 is provided above its bottom with an inwardly extending annular flange 8 extending from the rim of the bowl and constituting a seat for a lamp base or slab 9 of suitable insulating material. The base 9 is secured on the flange 8 by means of screws $9^a$ or the like, and said base has a central opening 10 for the passage of the electrical wires or conductors 11, which are preferably in the form of a cable. This cable 11 extends downwardly through the opening 10 so as to pass under the slab or base 9 and flange 8, and said flange has an aperture 12 adjacent to the arm 3, so that the cable 11 can extend upwardly through the aperture 12 and thence into the arm 3.

The end of the bore of the arm 3 opens laterally near the inner end of the arm, as at 13, so that the conductors or cable 11 extend from the bracket arm to the switch and battery or other source of electrical energy.

Mounted and secured on the lamp base 9 is a cluster of electrical lamp or bulb sockets 14 in which the lamps or bulbs 15 are engaged, and the wires of the cable 11 are connected to the sockets 14 to connect the bulbs in the circuits. The bulbs project upwardly from within the bowl 1, and are of different colors for purpose of signaling. Thus, as suggested in Fig. 4, one bulb is white to indicate clear conditions, or to enable the lamp to be used as an ordinary side lamp. The other bulbs are red, green and blue, or other colors can be used. The red bulb is to be used for indicating danger, that is, when the vehicle is to be stopped or backed up, while the green and blue bulbs can be used for indicating the fact that the vehicle is to be turned to the right or left.

A shade 16 of frosted glass or other semi-transparent light diffusing material is carried by the bowl 1 to surround and protect the bulbs 15, the shade being closed at the top and opened at the bottom, with its lower end fixed within the rim of the bowl and seating on the edge thereof. Screws 17 are threaded through the rim of the bowl to hold the shade snugly in place, and permit its removal for replacing the bulbs when they are burnt out. This shade not only protects the bulbs, but being of frosted glass, or the like, will also diffuse the light, so that this shade will be illuminated by any of the colored lights, so as to be noticeable.

In order to energize the lamps and control the lighting thereof, the cable 11 includes a common conductor or wire 18 connected to one terminal of each of the bulbs 15, and individual conductors or wires 19 are connected to the other terminals thereof and lead to contacts 20 of the controlling switch. The conductor 18 leads to one pole of a battery 21 or other suitable sort of electrical energy, and a conductor 22 leads from the other pole to the manually operable switch member 23 which can be brought into engagement with any one of the contacts 20, so as to close the desired circuit and light the electrical lamp. The white lamp can be left burning when desired, so that it constitutes a side lamp for the vehicle, and any of the colored lamps can be lighted according to the intentions of the operator to slow up or turn a corner.

Fig. 5 illustrates a modified from of bracket. The arm 3 instead of having a clamp at its inner end, is provided with a flange or base 5' to be secured by means of screws or other securing elements to the supporting member.

Having thus described the invention, what is claimed as new is:—

A vehicle signal comprising a bowl, having a boss at one side, a tubular bracket arm having means for attaching it to a support and secured within said boss, said bowl having an annular inwardly extending flange above the bottom thereof, a lamp base of insulating material secured on said flange and having an opening therethrough, a plurality of lamp sockets secured on the base, lamp bulbs fitted in the sockets and extending upwardly out of the bowl, a lamp shade inclosing and disposed over all of said bulbs and having its lower edge fitted within said bowl above said flange, means carried by the bowl above said flange for engaging the shade to retain it within the bowl, and electrical conductors extending through said bracket arm and boss under said flange and base and up through said opening for connection with said sockets.

In testimony whereof I have signed my name to this specification in the presence of two subscribing witnesses.

CHRISTOPHER JAMES LEDWIDGE.

Witnesses:
T. H. JACKSON,
J. O. LANGLEY.